United States Patent
Ueki

(10) Patent No.: US 11,164,064 B2
(45) Date of Patent: Nov. 2, 2021

(54) RFIC MODULE AND RFID TAG

(71) Applicant: Murata Manufacturing Co., Ltd., Nagaokakyo (JP)

(72) Inventor: Noriyuki Ueki, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 17/185,341

(22) Filed: Feb. 25, 2021

(65) Prior Publication Data

US 2021/0182649 A1   Jun. 17, 2021

Related U.S. Application Data

(63) Continuation of application No. PCT/JP2020/024786, filed on Jun. 24, 2020.

(30) Foreign Application Priority Data

Nov. 8, 2019  (JP) .............................. JP2019-202954

(51) Int. Cl.
*G06K 19/077* (2006.01)
*G06K 19/07* (2006.01)

(52) U.S. Cl.
CPC ... *G06K 19/07771* (2013.01); *G06K 19/0723* (2013.01); *G06K 19/07722* (2013.01); *G06K 19/07781* (2013.01)

(58) Field of Classification Search
CPC ......... G06K 19/07771; G06K 19/0723; G06K 19/07722; G06K 19/07781
USPC ........................................................ 235/492
See application file for complete search history.

(56) References Cited

U.S. PATENT DOCUMENTS

| 9,911,079 B2 * | 3/2018 | Kato | G06K 19/07749 |
| 10,726,322 B2 * | 7/2020 | Kato | H01Q 1/48 |
| 2008/0169349 A1 * | 7/2008 | Suzuki | H01L 27/1266 235/492 |
| 2009/0308938 A1 * | 12/2009 | Dokai | G06K 19/07749 235/492 |
| 2012/0326931 A1 | 12/2012 | Murayama et al. | |
| 2016/0350638 A1 * | 12/2016 | Kato | G06K 19/07752 |
| 2017/0083804 A1 | 3/2017 | Kato et al. | |
| 2018/0019054 A1 * | 1/2018 | Tenno | H01F 17/0006 |

(Continued)

FOREIGN PATENT DOCUMENTS

| WO | 2011108340 A1 | 9/2011 |
| WO | 2016084658 A1 | 6/2016 |
| WO | 2018101285 A1 | 6/2018 |

OTHER PUBLICATIONS

International Search Report issued for PCT/JP2020/024786, dated Sep. 8, 2020.

*Primary Examiner* — Michael G Lee
*Assistant Examiner* — David Tardif
(74) *Attorney, Agent, or Firm* — Arent Fox LLP

(57) ABSTRACT

An RFIC module is provided that includes an RFIC and an impedance matching circuit connected to an RFIC side first terminal electrode, an RFIC side second terminal electrode, an antenna side first terminal electrode and an antenna side second terminal electrode. The impedance matching circuit includes a first inductor, a second inductor, a third inductor, and a fourth inductor, and a conductor pattern that configures the first inductor, the second inductor, the third inductor, and the fourth inductor as a single coil-shaped pattern.

20 Claims, 11 Drawing Sheets

(56) References Cited

U.S. PATENT DOCUMENTS

| | | |
|---|---|---|
| 2018/0114104 A1 | 4/2018 | Kato et al. |
| 2019/0073579 A1* | 3/2019 | Kato .................. G06K 19/0775 |
| 2019/0173175 A1 | 6/2019 | Mikawa et al. |
| 2019/0188550 A1* | 6/2019 | Kato .................... G06K 19/077 |

* cited by examiner

RFIC MODULE AND RFID TAG

CROSS REFERENCE TO RELATED APPLICATIONS

The present application is a continuation of PCT/JP2020/024786 filed Jun. 24, 2020, which claims priority to Japanese Application No. 2019-202954, filed Nov. 8, 2019, the entire contents of each of which are incorporated herein by reference.

TECHNICAL FIELD

The present invention relates to an RFIC (Radio Frequency Integrated Circuit) module and an RFID (Radio Frequency Identifier) tag including the RFIC module.

BACKGROUND

International Publication No. 2016/084658 (hereinafter "Patent Literature 1") discloses an RFIC module to be coupled to a conductor that serves as an antenna. The RFIC module includes a substrate, an RFIC chip mounted in the substrate, and a matching circuit configured by a plurality of coils connected to the RFIC chip.

When the RFIC module having the structure disclosed in Patent Literature 1 is designed to be thinner and smaller, two coils among the plurality of coils that configure the matching circuit may be very close to each other. The coils thus disposed adjacent to each other may cause unwanted coupling between the coils. In addition, under the condition in which a plurality of RFIC modules are adjacent to each other, between the adjacent RFIC modules, the unwanted coupling easily occurs even between the coils for the matching circuits. With this configuration, the characteristics of the RFIC module and the RFID tag may be changed.

SUMMARY OF THE INVENTION

In view of the foregoing, an object of the present invention is to provide an RFIC module in which the influence of unwanted coupling between a plurality of coils configuring a matching circuit is significantly reduced and a region in which the plurality of coils configuring the matching circuit are provided is reduced.

Thus, an RFIC module according to an exemplary embodiment is provided that includes a substrate, an RFIC provided at the substrate, an RFIC side first terminal electrode and an RFIC side second terminal electrode to which the RFIC is connected. Moreover, an antenna side first terminal electrode and an antenna side second terminal electrode are provided at the substrate and are each configured to be directly connected or capacitively coupled to an antenna, and an impedance matching circuit is provided at the substrate and is connected to the RFIC side first terminal electrode, the RFIC side second terminal electrode, the antenna side first terminal electrode, and the antenna side second terminal electrode. The impedance matching circuit includes a first inductor, a second inductor, a third inductor, and a fourth inductor that are configured by a conductor pattern provided at the substrate. A first end of the first inductor is connected to the antenna side first terminal electrode, a second end of the first inductor is connected to the RFIC side first terminal electrode, a first end of the second inductor is connected to the antenna side second terminal electrode, and a second end of the second inductor is connected to the RFIC side second terminal electrode. A first end of the third inductor is connected to the antenna side first terminal electrode, a first end of the fourth inductor is connected to the antenna side second terminal electrode, and a second end of the third inductor and a second end of the fourth inductor are connected to each other. The conductor pattern that configures the first inductor, the second inductor, the third inductor, and the fourth inductor defines a single coil-shaped pattern.

In addition, an RFID tag as an exemplary embodiment is provide that includes an antenna, and an RFIC module connected or coupled to the antenna. The structure of this RFIC module is as described above.

According to the exemplary embodiments of the present invention, an RFIC module is provided in which the influence of unwanted coupling between a plurality of coils configuring a matching circuit is reduced and a region in which the plurality of coils configuring the matching circuit are provided is reduced. Moreover, an RFID tag including the RFIC module is provided.

DETAILED DESCRIPTION OF EXEMPLARY EMBODIMENTS

Figure 1A:
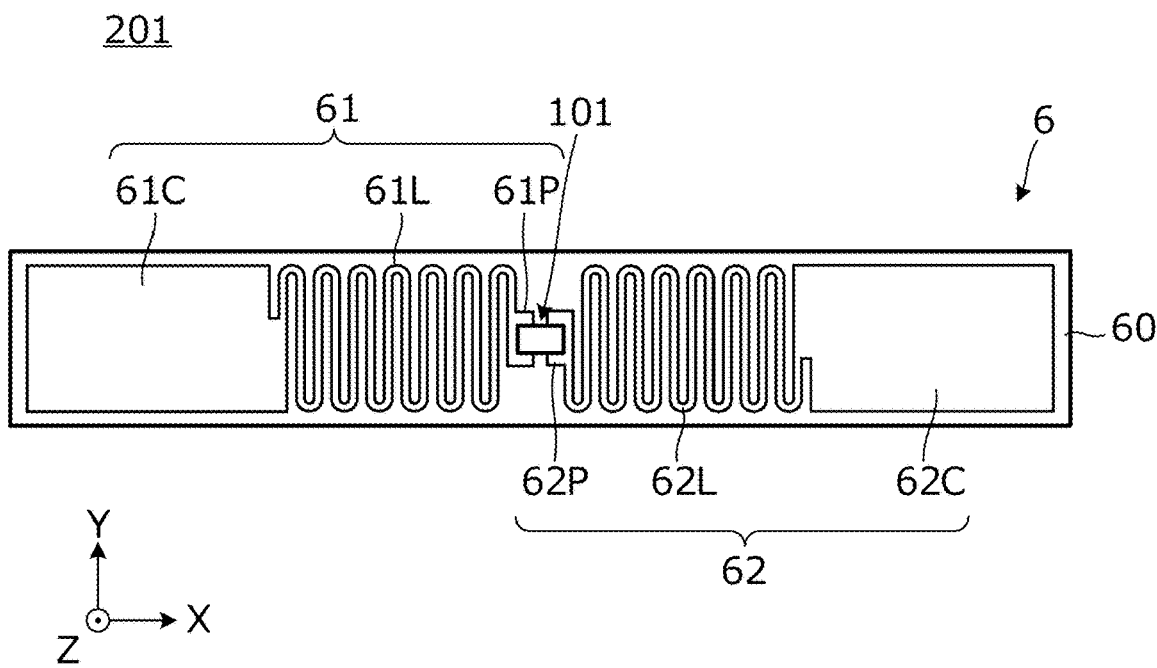
FIG. 1A is a plan view of an RFID tag 201 according to a first exemplary embodiment.
Figure 1B:
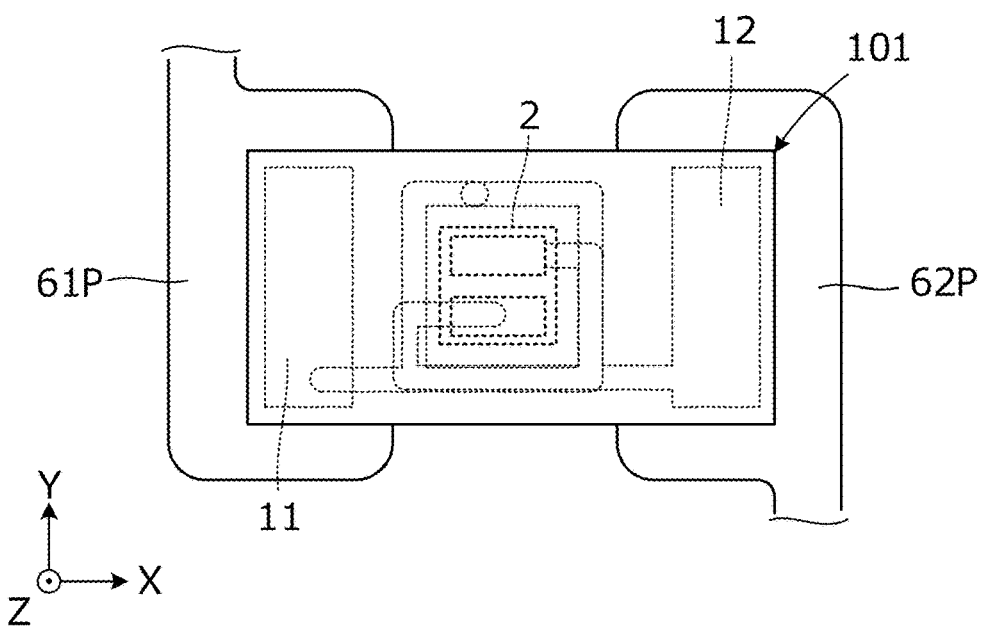
FIG. 1B is an enlarged plan view of a portion on which an RFIC module 101 included in the RFID tag 201 is mounted.

FIG. 1A is a plan view of an RFID tag 201 according to an exemplary embodiment of the present invention. FIG. 1B is an enlarged plan view of a portion on which an RFIC module 101 included in the RFID tag 201 is mounted.

As shown, the RFID tag 201 includes an antenna 6, and an RFIC module 101 coupled to the antenna 6. The antenna 6 includes an insulating film 60, and conductor patterns 61 and 62 provided or otherwise disposed on this insulating film 60. The insulating film 60 is, for example, a polyethylene terephthalate (PET) film, and the conductor patterns 61 and 62 are, for example, aluminum foil patterns.

The conductor pattern 61 includes conductor patterns 61P, 61L, and 61C, and the conductor pattern 62 includes conductor patterns 62P, 62L, and 62C. The conductor patterns 61 and 62 define a dipole antenna.

According to the exemplary aspect, the RFIC module 101 is mounted on the conductor patterns 61P and 62P. As shown, the conductor patterns 61L and 62L have a meander line shape and serve as a region having a high inductance component. In addition, the conductor patterns 61C and 62C have a planar shape and serve as a region having a high capacitance component. With this configuration, an inductance component in a high current intensity region is increased and a capacitance component in a high voltage intensity region is increased, which reduces a region in which the conductor patterns 61 and 62 of the antenna are provided.

Figure 2A:
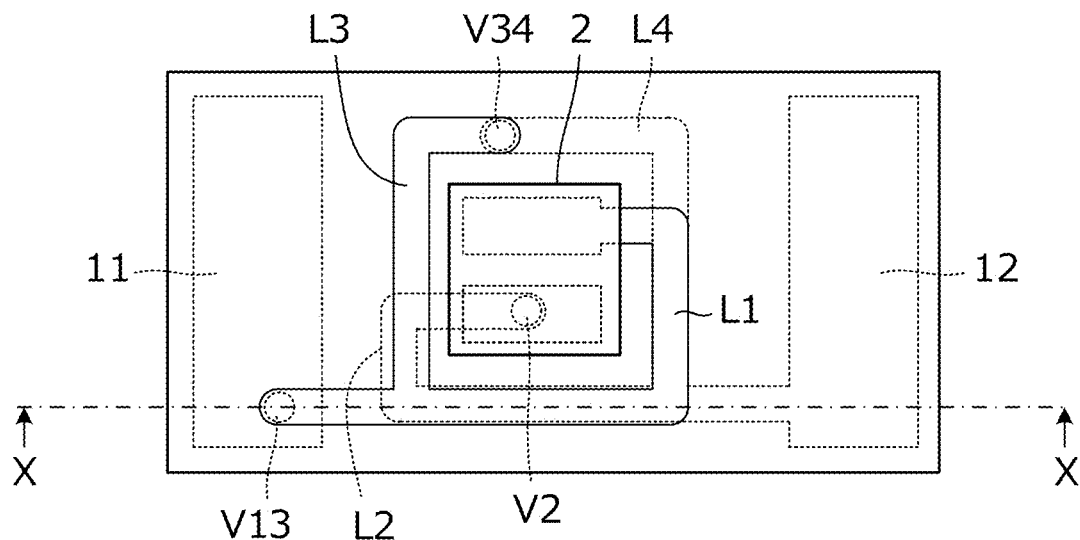
FIG. 2A is a plan view showing a conductor pattern provided at a substrate 1 of the RFIC module 101 in a state before a protective film is provided.
Figure 2B:
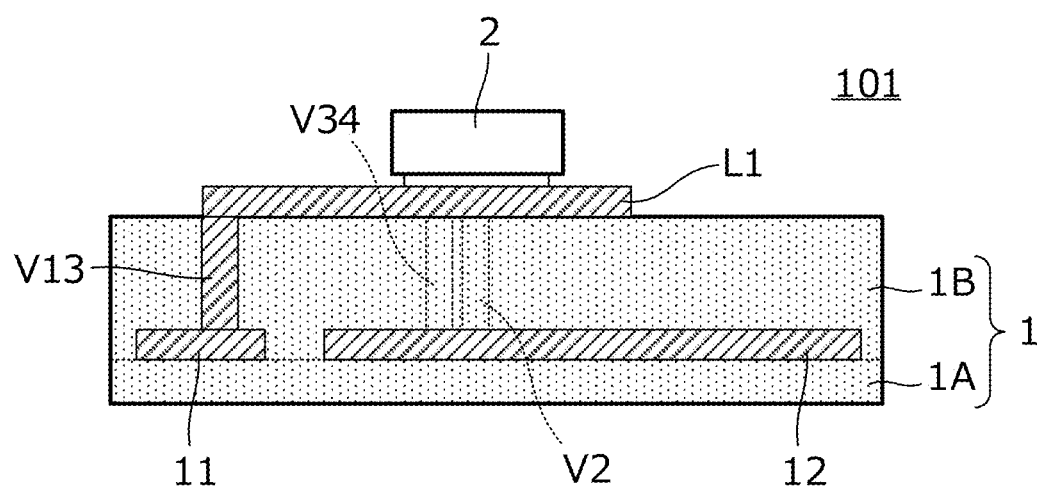
FIG. 2B is a cross-sectional view of an X-X portion in FIG. 2A.

FIG. 2A is a plan view showing a conductor pattern provided at a substrate 1 of the RFIC module 101 in a state before a protective film to be described below is provided. FIG. 2B is a cross-sectional view of an X-X portion in FIG. 2A.

This RFIC module 101 includes a substrate 1, and an RFIC 2 mounted on the substrate 1. The substrate 1 is, for example, a flexible substrate including polyimide or the like, and a stacked body including a first layer 1A and a second layer 1B.

Figure 3:
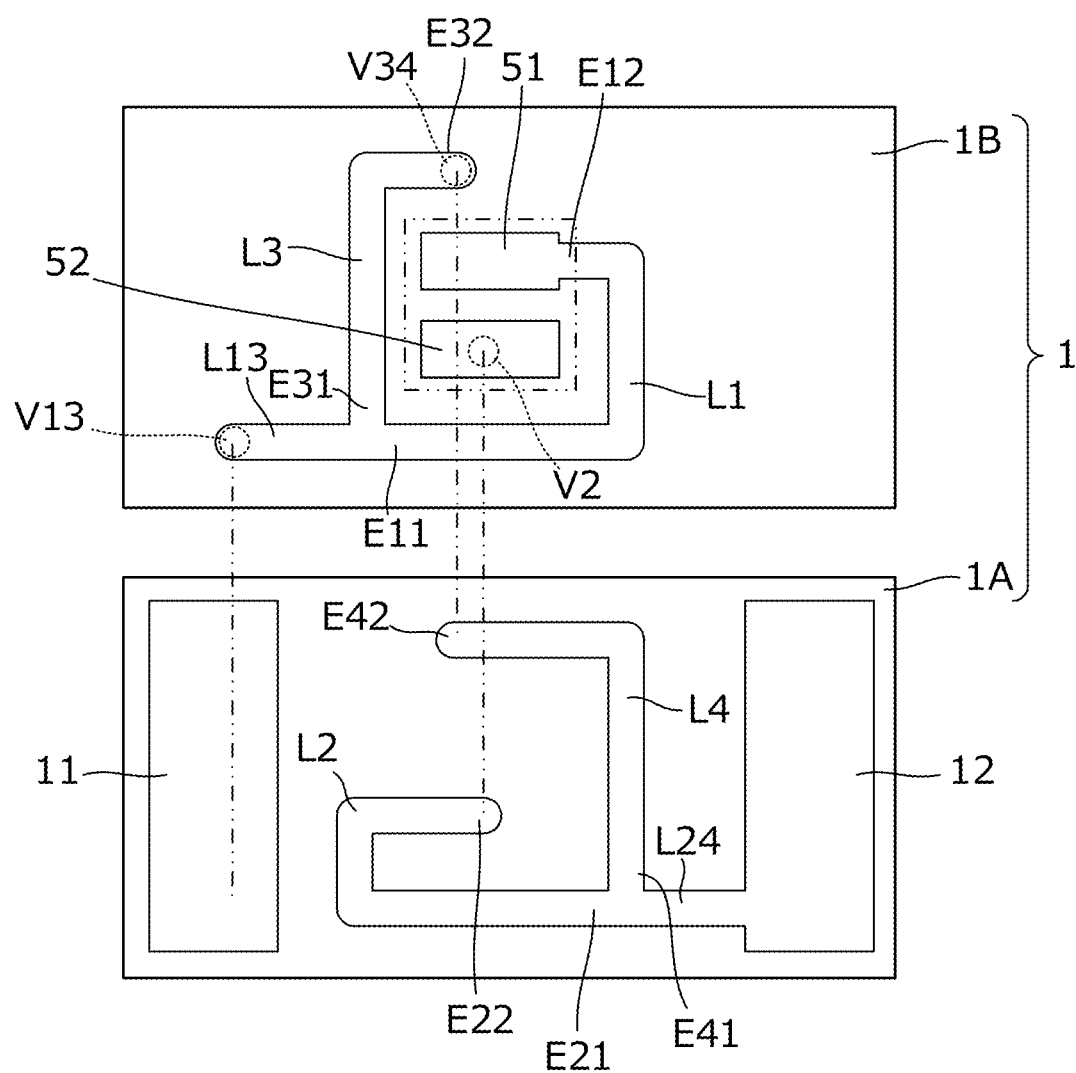
FIG. 3 is a plan view showing a conductor pattern provided on each layer of the substrate 1 of the RFIC module 101.

FIG. 3 is a plan view showing a conductor pattern provided on each layer of the substrate 1 of the RFIC module 101. The upper portion in FIG. 3 is a plan view of the second layer 1B of the substrate 1, and the lower portion in FIG. 3 is a plan view of the first layer 1A of the substrate 1.

The upper surface of the second layer 1B of the substrate 1 includes an RFIC side first terminal electrode 51, an RFIC side second terminal electrode 52, a first inductor L1, a third inductor L3, and a conductor pattern L13. An end of the conductor pattern L13 is connected to a first end E11 of the first inductor L1 and a first end E31 of the third inductor L3. The upper surface of the first layer 1A of the substrate 1 includes an antenna side first terminal electrode 11, an antenna side second terminal electrode 12, a second inductor L2, a fourth inductor L4, and a conductor pattern L24. An end of the conductor pattern L24 is connected to a first end E21 of the second inductor L2 and a first end E41 of the fourth inductor L4. Each of the conductor patterns is, for example, obtained by patterning copper foil by photolithography.

In addition, the second layer 1B includes via conductors V2, V13, and V34. The via conductor V34 connects a second end E32 of the third inductor L3 to a second end E42 of the fourth inductor L4. The via conductor V2 connects the RFIC side second terminal electrode 52 to a second end E22 of the second inductor L2. The via conductor V13 connects the other end of the conductor pattern L13 to the antenna side first terminal electrode 11.

The connection relationship described above, in other words, is as follows.

That is, the first end E11 of the first inductor L1 is connected to the antenna side first terminal electrode 11, and the second end E12 of the first inductor L1 is connected to the RFIC side first terminal electrode 51.

Moreover, the first end E21 of the second inductor L2 is connected to the antenna side second terminal electrode 12, and the second end E22 of the second inductor L2 is connected to the RFIC side second terminal electrode 52.

Furthermore, the first end E31 of the third inductor L3 is connected to the antenna side first terminal electrode 11, and the first end E41 of the fourth inductor L4 is connected to the antenna side second terminal electrode 12.

Finally, the second end E32 of the third inductor L3 and the second end E42 of the fourth inductor L4 are connected to each other.

In addition, the first inductor L1 and the third inductor L3 are configured by a conductor pattern wound along the second layer 1B of the substrate 1 and having a partial shape of a coil, and the second inductor L2 and the fourth inductor L4 are configured by a conductor pattern wound along the first layer 1A of the substrate 1 and having a partial shape of a coil.

Moreover, a winding direction from the first end E11 of the first inductor L1 to the second end E12 of the first inductor L1, a winding direction from the second end E32 of the third inductor L3 to the first end E31 of the third inductor L3, a winding direction from the first end E41 of the fourth inductor L4 to the second end E42 of the fourth inductor L4, and a winding direction from the second end E22 of the second inductor L2 to the first end E21 of the second inductor L2 are all in the left-handed direction according to the exemplary embodiments. In other words, all the winding directions are in the same direction.

In this aspect, the first inductor L1, the second inductor L2, the third inductor L3, and the fourth inductor L4 define a rectangular coil-shaped pattern.

Figure 4:
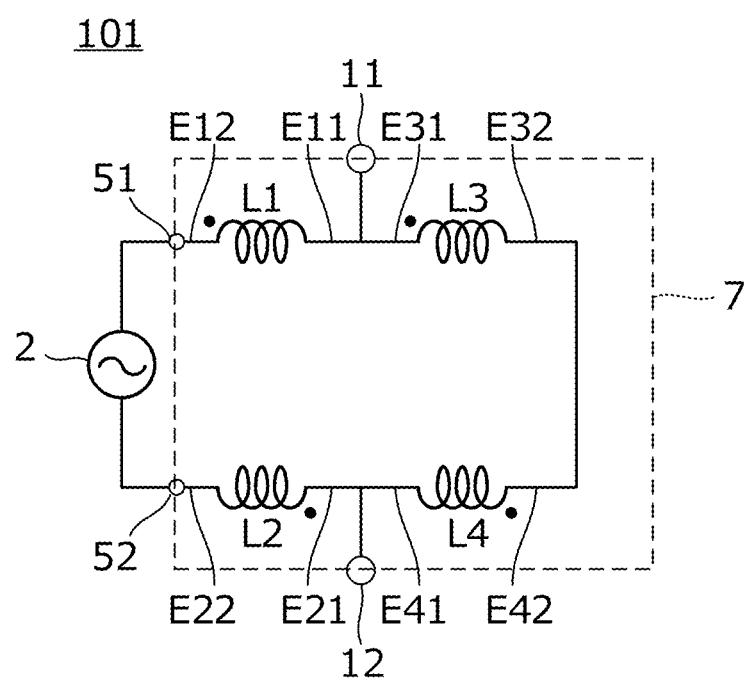
FIG. 4 is a circuit diagram of the RFIC module 101.

FIG. 4 is a circuit diagram of the RFIC module 101. As shown, the RFIC module 101 includes an RFIC 2 and an impedance matching circuit 7. The impedance matching circuit 7 includes the first inductor L1, the second inductor L2, the third inductor L3, and the fourth inductor L4. The dot symbol in FIG. 4 indicates a coil winding direction of each inductor. As shown in FIG. 3, a sum of the line length (i.e., the number of turns) of the first inductor L1 and the line length (i.e., the number of turns) of the second inductor L2 is longer than a sum of the line length (i.e., the number of turns) of the third inductor L3 and the line length (i.e. the number of turns) of the fourth inductor L4. When it is expressed in terms of the magnitude of inductance, the relationship of (L1+L2)>(L3+L4) is satisfied.

Figure 5A:
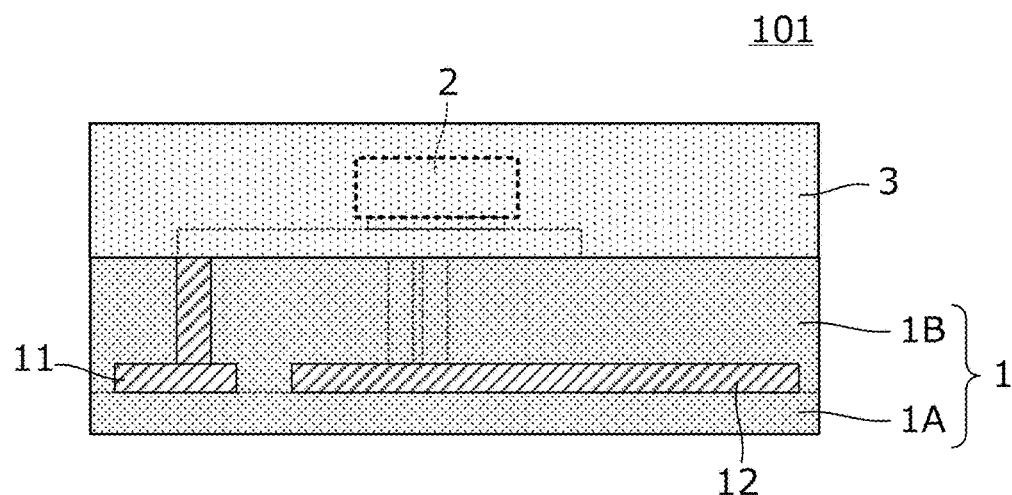
FIG. 5A is a cross-sectional view of the RFIC module 101.
Figure 5B:
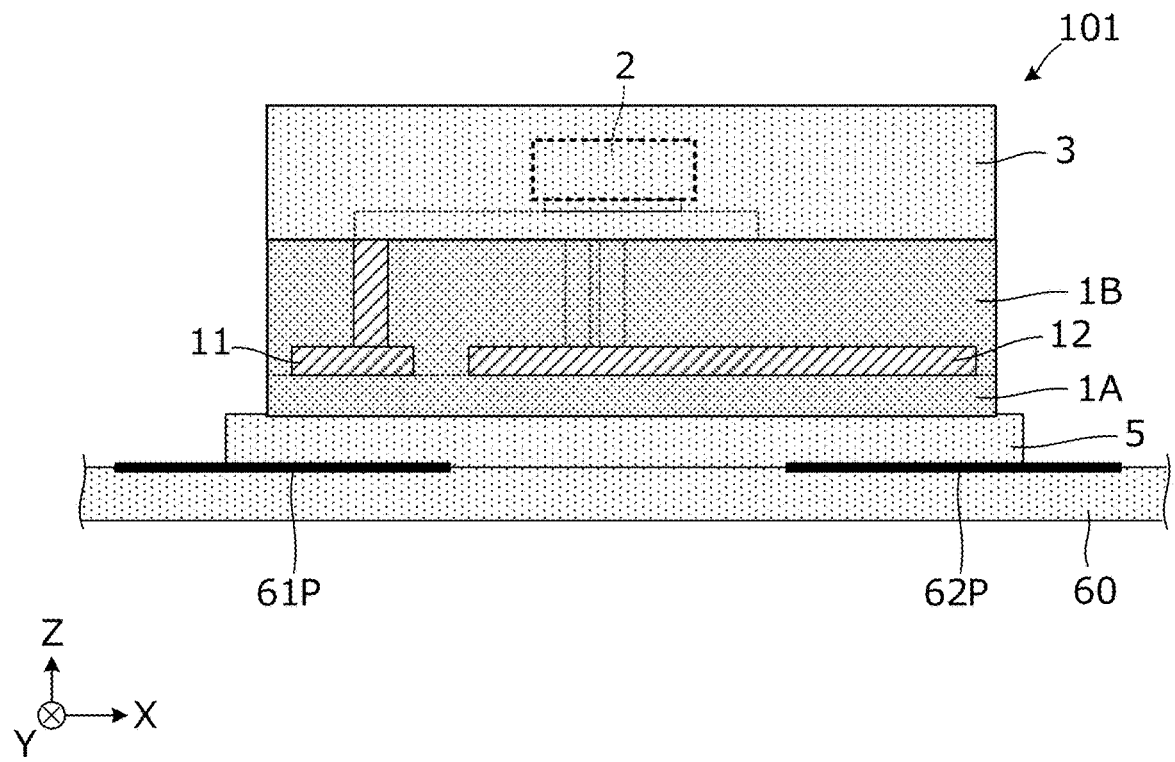
FIG. 5B is a cross-sectional view showing a state in which the RFIC module 101 is adhered to an insulating film 60 of an antenna 6 through an adhesive layer 5.

FIG. 5A is a cross-sectional view of the RFIC module 101, and FIG. 5B is a cross-sectional view showing a state in which the RFIC module 101 is adhered to the insulating film 60 of the antenna 6 through an adhesive layer 5. The upper surface of the substrate 1 on which the RFIC 2 is mounted is covered with a protective film 3. The protective film 3 includes, for example, a hot melt agent such as elastomer such as polyurethane, and ethylene vinyl acetate (EVA). Both of the substrate 1 and the protective film 3 are flexible, and the entirety of the RFIC module 101 is flexible.

The adhesive layer 5 shown in FIG. 5B is a layer of an insulating adhesive material, and includes an acrylic adhesive agent, for example. The antenna side first terminal electrode 11 faces the conductor pattern 61P of the antenna 6 through the first layer 1A and the adhesive layer 5, and the antenna side second terminal electrode 12 faces the conductor pattern 62P of the antenna 6 through the first layer 1A and the adhesive layer 5. With this structure, the antenna side first terminal electrode 11 and the antenna side second terminal electrode 12 are respectively capacitively coupled to the conductor patterns 61P and 62P of the antenna 6.

Figure 6:
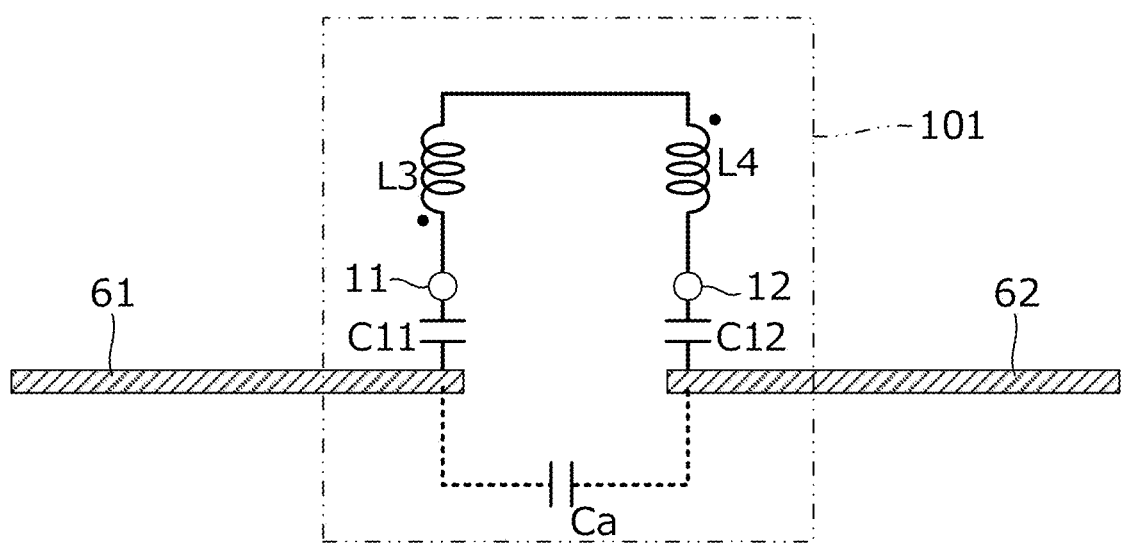
FIG. 6 is a diagram showing a connection relationship between a third inductor L3, a fourth inductor L4, and conductor patterns 61 and 62 of the antenna.

FIG. 6 is a diagram showing a connection relationship between the third inductor L3 and the fourth inductor L4, and the conductor patterns 61 and 62 of the antenna. A capacitor Ca in FIG. 6 is a capacitive component generated between the conductor patterns 61 and 62 of the antenna. In addition, a capacitor C11 is a capacitive component generated between the conductor pattern 61 of the antenna and the antenna side first terminal electrode 11, and a capacitor C12 is a capacitive component generated between the conductor pattern 62 of the antenna and the antenna side second terminal electrode 12. The inductance of the inductors L3 and L4 and the capacitance of the capacitors Ca, C11, and C12 define a parallel resonance circuit. The resonance frequency of this resonance circuit is set to match the center frequency of the communication frequency band of the RFID tag 201.

Figure 7A:
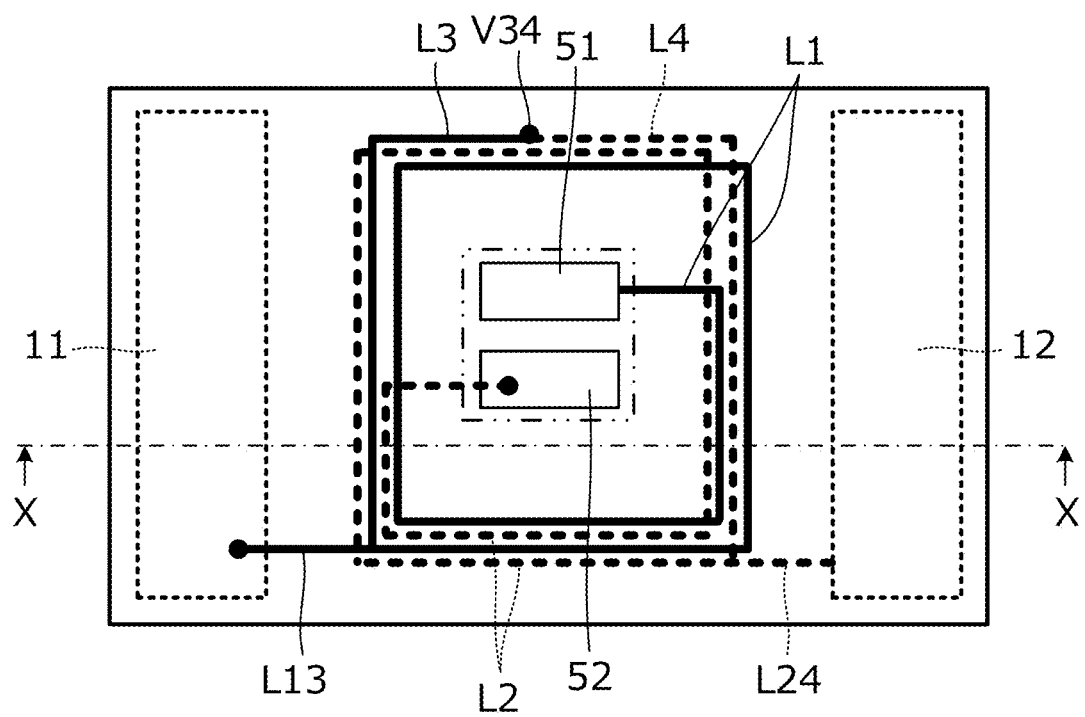
FIG. 7A shows another RFIC module according to the first exemplary embodiment, and is a plan view of a substrate 1 of the RFIC module in a state before an RFIC 2 is mounted.
Figure 7B:
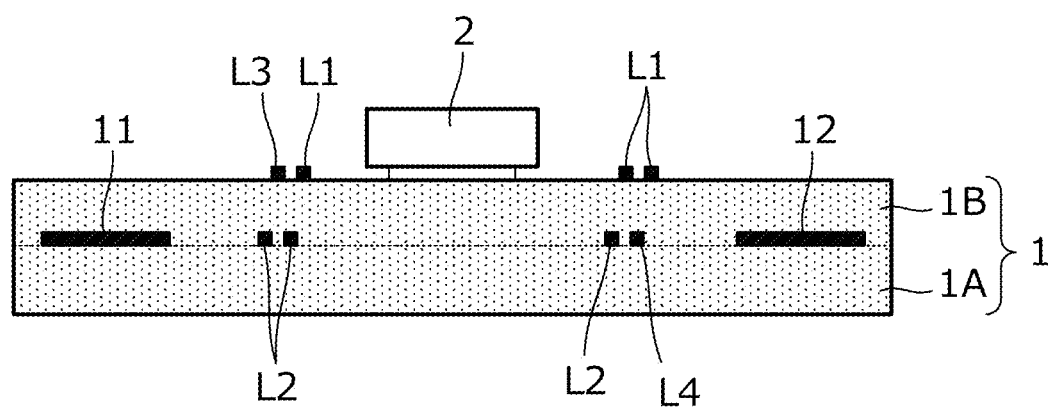
FIG. 7B is a cross-sectional view of an X-X portion in FIG. 7A in a state after the RFIC 2 has been mounted.

FIG. 7A shows another RFIC module according to the first exemplary embodiment, and is a plan view of the substrate 1 of the RFIC module in a state before the RFIC 2 is mounted. FIG. 7B is a cross-sectional view of an X-X portion in FIG. 7A in a state after the RFIC 2 has been mounted.

In this example, the number of turns of a conductor pattern that configures the inductors L1, L2, L3, and L4 is larger than the number of turns in the example mainly shown in FIG. 2A and FIG. 2B.

The upper surface of the second layer 1B of the substrate 1 includes an RFIC side first terminal electrode 51, an RFIC side second terminal electrode 52, a first inductor L1, a third inductor L3, and a conductor pattern L13. The upper surface of the first layer 1A of the substrate 1 includes an antenna side first terminal electrode 11, an antenna side second terminal electrode 12, a second inductor L2, a fourth inductor L4, and a conductor pattern L24. The second layer 1B of the substrate 1 includes a via conductor V34 that connects the third inductor L3 and the fourth inductor L4.

As described above, even in a case in which the number of turns of the conductor pattern that configures the inductors L1, L2, L3, and L4 is increased, a predetermined conductor pattern is made into a spiral shape, so that the conductor pattern that configures the inductors L1, L2, L3, and L4 is able to be configured to provide a single coil-shaped pattern.

According to the present exemplary embodiment, the following advantageous effects are obtained.

(a) The conductor pattern that configures the inductors L1, L2, L3, and L4 that configure the impedance matching circuit 7 defines a single coil-shaped pattern, so that a region in which the inductors L1, L2, L3, and L4 that configure the matching circuit are provided is reduced. In addition, the inductors L1, L2, L3, and L4 are adjacent to each other from the start, so that, as compared to a case in which when a plurality of coils that configure the inductors L1, L2, L3, and L4 are arranged in parallel to each other, the coils are adjacent to each other in a plane direction, the influence of unwanted coupling between the plurality of coils is reduced.

(b) As shown in FIG. 4, the coil winding directions of the inductors L1, L2, L3, and L4 are in the same direction as that of order of the inductors L1, L3, L4, and L2. As a result of this configuration, in a current path viewed from a connection portion (i.e., the RFIC side first terminal electrode 51 and the RFIC side second terminal electrode 52) of the RFIC 2 (e.g., a feeding circuit), the inductors L1, L2, L3, and L4 do not reduce the magnetic flux of each other, and predetermined inductance is able to be obtained, which also results in reducing the region in which the inductors L1, L2, L3, and L4 are provided.

(c) The substrate 1 includes the first layer 1A and the second layer 1B, the first inductor L1 and the third inductor L3 are configured on the second layer 1B of the substrate 1, and the second inductor L2 and the fourth inductor L4 are configured on the first layer 1A of the substrate 1. As a result, a pair of the first inductor L1 with a relatively large inductance and the third inductor L3 with a relatively small inductance, and a pair of the second inductor L2 with a relatively large inductance and the fourth inductor L4 with a relatively small inductance are disposed at different layers, which also results in reducing the region in which the inductors L1, L2, L3, and L4, are provided.

(d) The inductance of the inductors L1, L2, L3, and L4 has a relationship of (L1+L2)>(L3+L4), so that the matching with an RFIC that has usually an impedance value 10 times or more than the impedance of an antenna is easily performed. In addition, the inductors L1 and L2 are disposed on the inner peripheral side of the coil pattern, so that the inductors L1 and L2 with a plurality of turns are able to be easily provided, and the inductors L3 and L4 are disposed on the outer peripheral side of the coil pattern, so that the wiring of the impedance matching circuit 7 to the antenna side first terminal electrode 11 and the antenna side second terminal electrode 12 is easily performed.

Second Exemplary Embodiment

A second exemplary embodiment describes an example in which inductors L1, L2, L3, and L4 are provided on a single layer of a substrate.

Figure 8A:
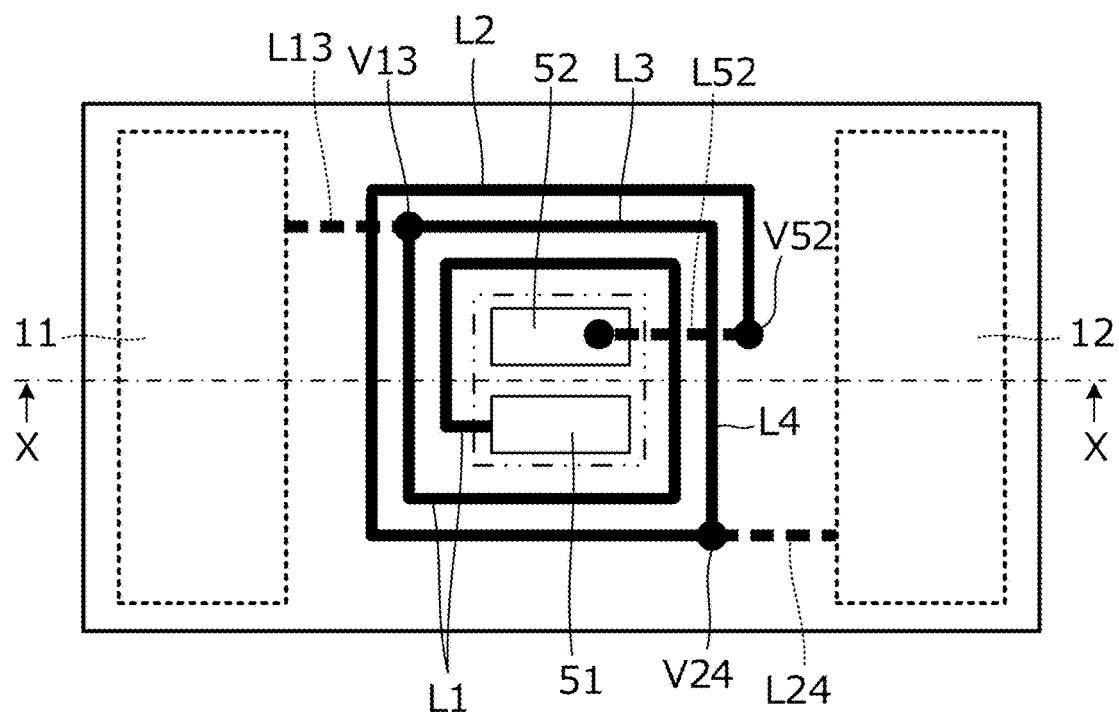
FIG. 8A shows an RFIC module according to a second exemplary embodiment, and is a plan view of a substrate 1 of the RFIC module in a state before an RFIC 2 is mounted.
Figure 8B:
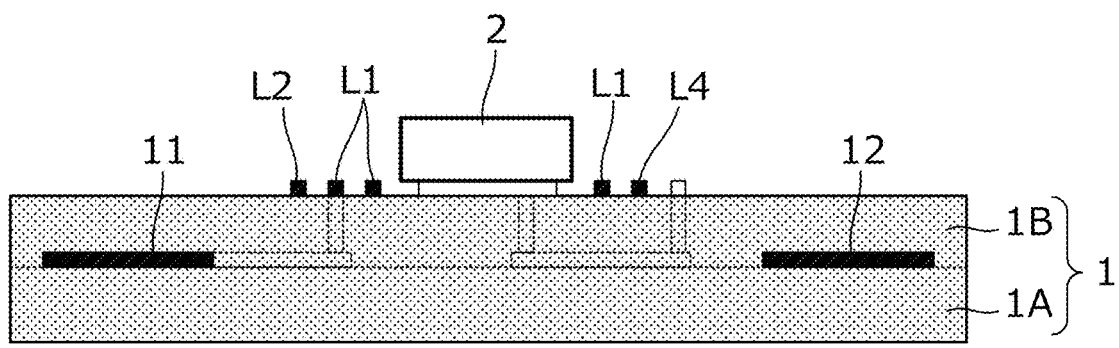
FIG. 8B is a cross-sectional view of an X-X portion in FIG. 8A in a state after the RFIC 2 has been mounted.
Figure 9:
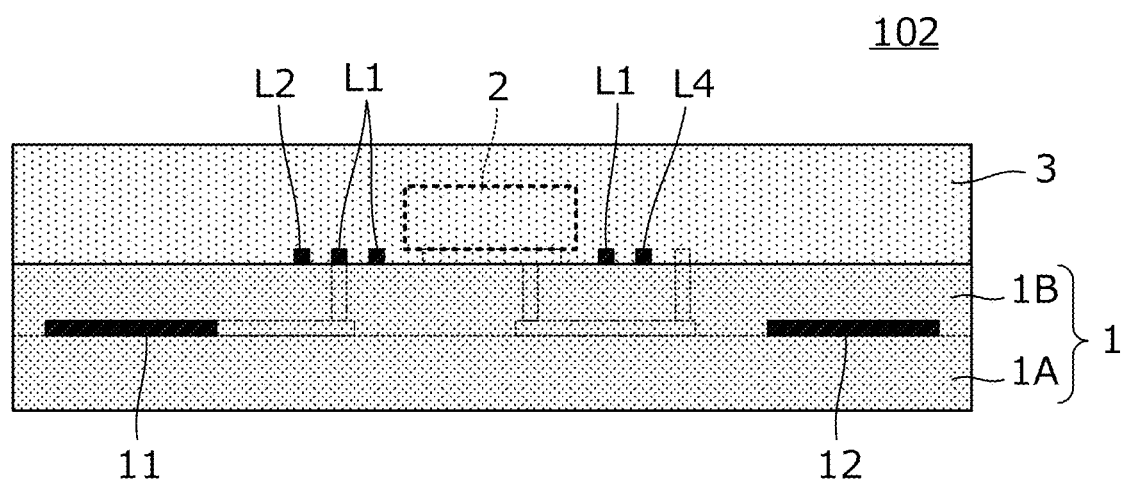
FIG. 9 is a cross-sectional view of the RFIC module 102 according to the second exemplary embodiment, and is a cross-sectional view in a state in which an upper surface of the substrate 1 on which the RFIC 2 is mounted is covered with a protective film 3.

FIG. 8A shows an RFIC module according to the second exemplary embodiment, and is a plan view of a substrate 1 of the RFIC module in a state before an RFIC 2 is mounted. FIG. 8B is a cross-sectional view of an X-X portion in FIG. 8A in a state after the RFIC 2 has been mounted. FIG. 9 is a cross-sectional view of an RFIC module 102 according to the present exemplary embodiment, and is a cross-sectional view in a state in which an upper surface of the substrate 1 on which the RFIC 2 is mounted is covered with a protective film 3.

In this example, a conductor pattern that configures the inductors L1, L2, L3, and L4 is provided on the upper surface of a second layer 1B of the substrate 1.

The upper surface of the second layer 1B of the substrate 1 includes an RFIC side first terminal electrode 51, an RFIC side second terminal electrode 52, a first inductor L1, a second inductor L2, a third inductor L3, and a fourth inductor L4. The upper surface of a first layer 1A of the substrate 1 includes an antenna side first terminal electrode 11, an antenna side second terminal electrode 12, a conductor pattern L13, a conductor pattern L24, and a conductor pattern L52. In addition, the second layer 1B of the substrate 1 includes a via conductor V13 that connects the first inductor L1 and the third inductor L3, a via conductor V24 that connects the second inductor L2 and the fourth inductor L4, and a via conductor V52 that connects the second inductor L2 and the conductor pattern L52.

As described above, even in a case in which the four inductors L1, L2, L3, and L4 are provided on a single layer, since a predetermined conductor pattern is made into a spiral shape, the conductor pattern that configures the inductors L1, L2, L3, and L4 is able to be provided on a single layer of the substrate 1.

It is noted that the antenna side first terminal electrode 11 and the antenna side second terminal electrode 12 may be provided on the same layer as the layer including the inductors L1, L2, L3, and L4.

Third Exemplary Embodiment

A third exemplary embodiment describes an example of an RFIC module configured such that an RFIC side first terminal electrode 51 and an RFIC side second terminal electrode 52 do not overlap with a coil opening of a coil-shaped pattern that configures inductors L1, L2, L3, and L4.

Figure 10:
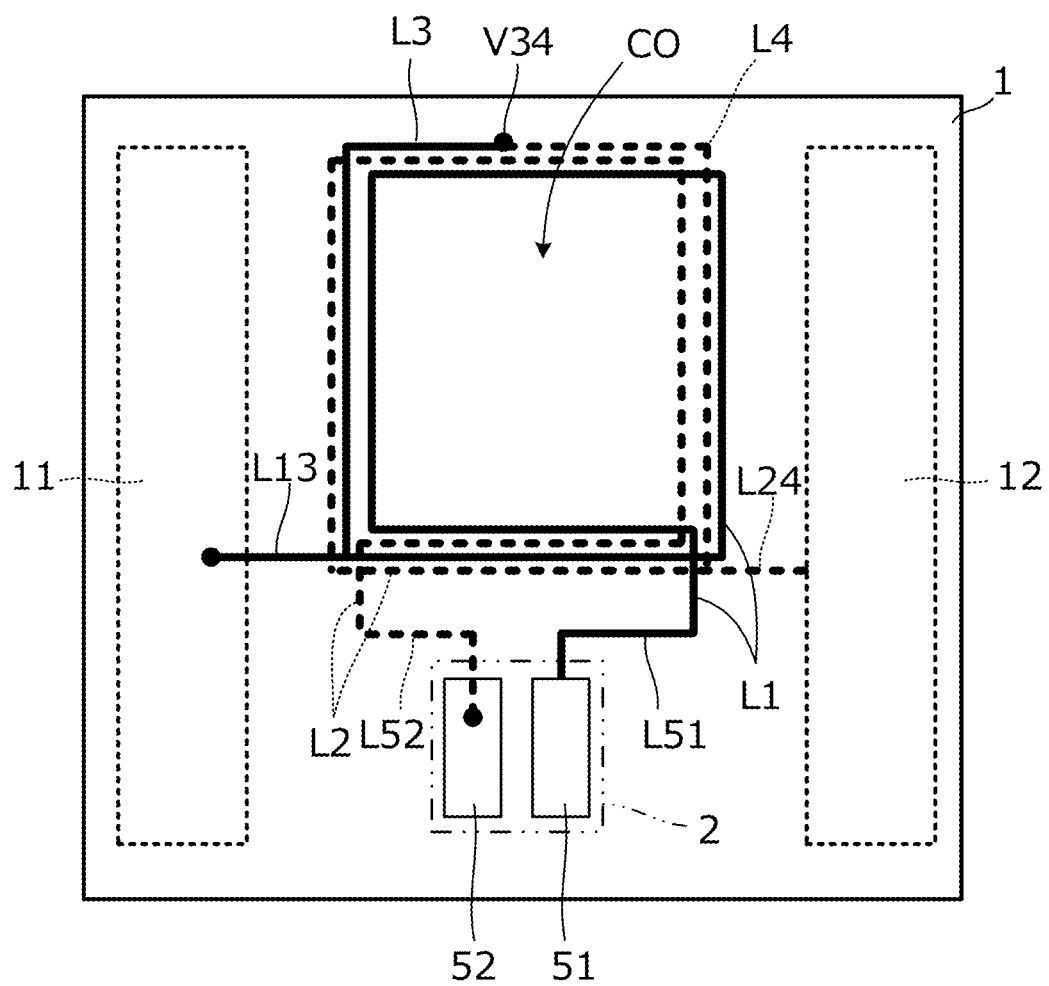
FIG. 10 is a plan view showing a conductor pattern provided at a substrate 1 of an RFIC module according to a third exemplary embodiment.
Figure 11:
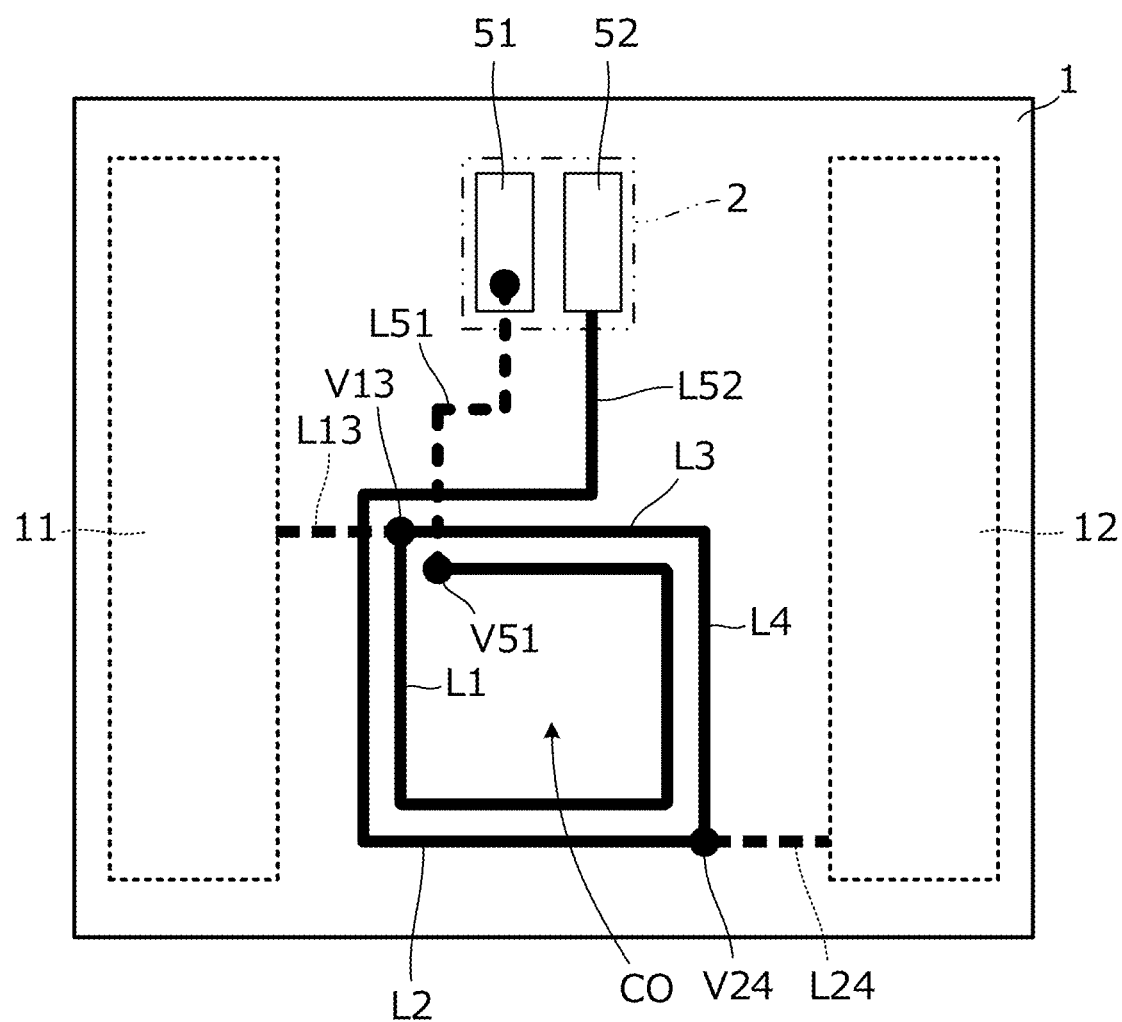
FIG. 11 is a plan view showing a conductor pattern provided at a substrate 1 of another RFIC module according to the third exemplary embodiment.

FIG. 10 is a plan view showing a conductor pattern provided at a substrate 1 of the RFIC module according to the third exemplary embodiment. FIG. 11 is a plan view showing a conductor pattern provided at a substrate 1 of another RFIC module according to the third exemplary embodiment. In FIG. 10 and FIG. 11, the position at which the RFIC 2 is mounted is indicated by a two-dot chain line.

In the example shown in FIG. 10, a conductor pattern that configures inductors L1, L2, L3, and L4, conductor patterns L13, L24, L51, and L52, a via conductor V34, an antenna side first terminal electrode 11, an antenna side second terminal electrode 12, an RFIC side first terminal electrode 51, and an RFIC side second terminal electrode 52 are provided at the substrate 1.

In the example shown in FIG. 11, a conductor pattern that configures inductors L1, L2, L3, and L4, conductor patterns L13, L24, L51, and L52, via conductors V13, V24, and V51, an antenna side first terminal electrode 11, an antenna side second terminal electrode 12, an RFIC side first terminal electrode 51, and an RFIC side second terminal electrode 52 are provided at the substrate 1.

In either of the examples shown in FIG. 10 and FIG. 11, the conductor pattern that configures the inductors L1, L2, L3, and L4 is provided so as to extend around a single coil opening CO. Moreover, the RFIC side first terminal electrode 51 and the RFIC side second terminal electrode 52 are provided at a position that does not overlap with the coil opening CO.

According to the present exemplary embodiment, since the RFIC 2 does not block the magnetic flux that passes through the coil opening CO of the inductors L1, L2, L3, and L4, the characteristic degradation of the inductors L1, L2, L3, and L4 due to the presence of the RFIC 2 is avoided. In addition, the characteristic change due to the deviation of the mounting position of the RFIC 2 is also avoided. Moreover, since the RFIC 2 causes no reduction in the inductance of the inductors L1, L2, L3, and L4, the coil opening CO of the conductor pattern that configures the inductors L1, L2, L3, and L4 is made smaller. With this configuration, the overall size is not increased even when the RFIC 2 is disposed outside of the coil opening CO.

In general, it is noted that the description of the above exemplary embodiments is illustrative in all respects, but not restrictive. Modifications and changes are able to appropriately be made by those skilled in the art.

For example, in the example shown in FIG. 5B, while the antenna side first terminal electrode 11 and the conductor pattern 61P of the antenna are capacitively coupled and the antenna side second terminal electrode 12 and the conductor pattern 62P of the antenna are capacitively coupled, this capacitive coupling portion may be directly (e.g., in a direct current manner) connected. Alternatively, one may be directly connected and the other may be capacitively coupled.

In addition, in any of the exemplary embodiments described above, while the example in which the RFIC 2 is mounted on the upper surface of the substrate 1 has been shown, the RFIC 2 may be disposed inside of the substrate 1. For example, the RFIC side first terminal electrode 51 and the RFIC side second terminal electrode 52 may be provided on the first layer 1A, and the RFIC 2 may be provided on the first layer 1A. In such a case, an opening (e.g., a cavity) may be provided on the second layer 1B to avoid interference with the RFIC 2.

REFERENCE SIGNS LIST

Ca, C11, C12—capacitor
CO—coil opening
E11—first end of a first inductor L1
E12—second end of a first inductor L1
E21—first end of a second inductor L2
E22—second end of a second inductor L2
E31—first end of a third inductor L3
E32—second end of a third inductor L3
E41—first end of a fourth inductor L4
E42—second end of a fourth inductor L4
L1—first inductor
L2—second inductor
L3—third inductor
L4—fourth inductor
L13, L24, L51, L52—conductor pattern
V2, V13, V34, V24, V51, V52—via conductor
1—substrate
1A—first layer
1B—second layer
2—RFIC
3—protective film
5—adhesive layer
6—antenna
7—impedance matching circuit
11—antenna side first terminal electrode
12—antenna side second terminal electrode
51—RFIC side first terminal electrode
52—RFIC side second terminal electrode
60—insulating film
61, 62—conductor pattern
61P, 61L, 61C—conductor pattern
62P, 62L, 62C—conductor pattern
101, 102—RFIC module
201—RFID tag

The invention claimed is:
1. An RFIC module comprising:
a substrate;
an RFIC provided at the substrate;
an RFIC side first terminal electrode and an RFIC side second terminal electrode that are each connected to the RFIC;
an antenna side first terminal electrode and an antenna side second terminal electrode that are provided at the substrate and that are each configured to be directly connected or capacitively coupled to an antenna; and
an impedance matching circuit that is provided at the substrate and is connected to the RFIC side first and second terminal electrodes and the antenna side first and second terminal electrodes,
wherein the impedance matching circuit comprises a conductor pattern that includes a first inductor, a second inductor, a third inductor, and a fourth inductor, wherein a first end of the first inductor is connected to the antenna side first terminal electrode, and a second end of the first inductor is connected to the RFIC side first terminal electrode, wherein a first end of the second inductor is connected to the antenna side second terminal electrode, and a second end of the second inductor is connected to the RFIC side second terminal electrode, wherein a first end of the third inductor is connected to the antenna side first terminal electrode, wherein a first end of the fourth inductor is connected to the antenna side second terminal electrode, wherein a second end of the third inductor is connected to a second end of the fourth inductor, and wherein the conductor pattern defines a single coil-shaped pattern.

2. The RFIC module according to claim 1, wherein a winding direction from the first end of the first inductor to the second end of the first inductor, a winding direction from the second end of the third inductor to the first end of the third inductor, a winding direction from the first end of the fourth inductor to the second end of the fourth inductor, and a winding direction from the second end of the second inductor to the first end of the second inductor are all in a same direction.

3. The RFIC module according to claim 1, wherein the substrate includes a first layer and a second layer.

4. The RFIC module according to claim 3, wherein the first inductor and the third inductor are configured by a conductor pattern that is wound along the second layer of the substrate and has a shape or partial shape of a coil.

5. The RFIC module according to claim 4, wherein the second inductor and the fourth inductor are configured by a conductor pattern that is wound along the first layer of the substrate and has a shape or partial shape of a coil.

6. The RFIC module according to claim 5, wherein the first and second layers are stacked on each other, with the antenna side first and second terminal electrodes being disposed on a surface of the first layer.

7. The RFIC module according to claim 6, wherein the first and third inductors are connected to the antenna side first terminal electrode by at least one via extending through the second layer of the substrate.

8. The RFIC module according to claim 1,
wherein L1 represents an inductance of the first inductor, L2 represents an inductance of the second inductor, L3 represents an inductance of the third inductor, and L4 represents an inductance of the fourth inductor, and
wherein the conductor pattern of the impedance matching circuit is constructed such that (L1+L2)>(L3+L4).

9. The RFIC module according to claim 8, wherein a sum of line lengths of the first and second inductors is longer than a sum of line lengths of the third and fourth inductors.

10. The RFIC module according to claim 1, wherein the RFIC is disposed at a position in the substrate that does not overlap with a region of the substrate in which the first inductor, the second inductor, the third inductor, and the fourth inductor are disposed.

11. An RFIC module comprising:
a substrate;
an RFIC disposed at the substrate;
RFIC side first and second terminal electrodes provided at the substrate and connected to the RFIC;
antenna side first and second terminal electrodes provided at the substrate; and
a conductor pattern coupling the RFIC side first and second terminal electrodes and the antenna side first and second terminal electrodes, with the conductor pattern formed by a first inductor, a second inductor, a third inductor, and a fourth inductor, wherein the first inductor is connected between the antenna side first terminal electrode and the RFIC side first terminal electrode, wherein the second inductor is connected between the antenna side second terminal electrode and the RFIC side second terminal electrode, wherein the third inductor is connected between the antenna side first terminal electrode and the fourth inductor, and wherein the fourth inductor is connected between the antenna side second terminal electrode and the third inductor.

12. The RFIC module according to claim 11, wherein the conductor pattern defines a single coil-shaped pattern.

13. The RFIC module according to claim 11, wherein the antenna side first and second terminal electrodes are configured to be directly connected or capacitively coupled to an antenna.

14. The RFIC module according to claim 11,
wherein a first end of the first inductor is connected to a first end of the third inductor, a first end of the second inductor is connected to a first end of the fourth inductor, and a second end of the third inductor is connected to a second end of the fourth inductor, and
wherein a winding direction from the first end of the first inductor to a second end of the first inductor, a winding direction from the second end of the third inductor to the first end of the third inductor, a winding direction from the first end of the fourth inductor to the second end of the fourth inductor, and a winding direction from a second end of the second inductor to the first end of the second inductor are all in a same direction.

15. The RFIC module according to claim 11,
wherein the substrate includes a first layer and a second layer,
wherein the first inductor and the third inductor are configured by a conductor pattern that is wound along the second layer of the substrate and has a shape or partial shape of a coil, and
wherein the second inductor and the fourth inductor are configured by a conductor pattern that is wound along the first layer of the substrate and has a shape or partial shape of a coil.

16. The RFIC module according to claim 15, wherein the first and second layers are stacked on each other, with the antenna side first and second terminal electrodes being disposed on a surface of the first layer.

17. The RFIC module according to claim 16, wherein the first and third inductors are connected to the antenna side first terminal electrode by at least one via extending through the second layer of the substrate.

18. The RFIC module according to claim 11,
wherein L1 represents an inductance of the first inductor, L2 represents an inductance of the second inductor, L3 represents an inductance of the third inductor, and L4 represents an inductance of the fourth inductor, and
wherein the conductor pattern is constructed such that (L1+L2)>(L3+L4).

19. The RFIC module according to claim 11, wherein the RFIC is disposed at a position in the substrate that does not overlap with a region of the substrate in which the first inductor, the second inductor, the third inductor, and the fourth inductor are disposed.

20. An RFID tag comprising:
an antenna; and
an RFIC module according to claim 1.

* * * * *